(12) United States Patent
Campbell et al.

(10) Patent No.: US 10,552,148 B2
(45) Date of Patent: Feb. 4, 2020

(54) BUILDING DYNAMIC DOCUMENTATION BASED ON INSTALLED SERVICES

(71) Applicant: Palantir Technologies Inc., Palo Alto, CA (US)

(72) Inventors: James Campbell, Brooklyn, NY (US); Sarang Shah, Oakland, CA (US); Kelsey Falter, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/410,512

(22) Filed: May 13, 2019

(65) Prior Publication Data

US 2019/0265969 A1     Aug. 29, 2019

Related U.S. Application Data

(63) Continuation of application No. 15/456,420, filed on Mar. 10, 2017, now abandoned.

(60) Provisional application No. 62/433,153, filed on Dec. 12, 2016.

(51) Int. Cl.
*G06F 8/73* (2018.01)
*G06F 8/71* (2018.01)
*G06F 8/61* (2018.01)
*G06F 16/93* (2019.01)

(52) U.S. Cl.
CPC .................. *G06F 8/73* (2013.01); *G06F 8/61* (2013.01); *G06F 8/71* (2013.01); *G06F 16/93* (2019.01)

(58) Field of Classification Search
None
See application file for complete search history.

(56) References Cited

U.S. PATENT DOCUMENTS

| 7,100,115 | B1 | 8/2006 | Yennaco |
| 7,536,684 | B2 | 5/2009 | Patrizio |
| 7,861,162 | B2 | 12/2010 | Lee |
| 8,099,664 | B2 | 1/2012 | Kureshy |
| 2005/0125729 | A1 | 6/2005 | Lee |
| 2007/0169063 | A1 | 7/2007 | Bauman |
| 2007/0220428 | A1 | 9/2007 | Kureshy |
| 2008/0271012 | A1 | 10/2008 | Eykholt |
| 2009/0183066 | A1 | 7/2009 | Crawford |
| 2012/0054607 | A1 | 3/2012 | Otsuka |

(Continued)

OTHER PUBLICATIONS

HelpNDoc Online Help, HelpNDoc, dated Mar. 19, 2016, 12 pages.

(Continued)

*Primary Examiner* — Geoffrey R St Leger
(74) *Attorney, Agent, or Firm* — Elliot H. Karlin; Hickman Palermo Becker Bingham LLP (57) ABSTRACT

Techniques for dynamically building documentation based on installed services are described herein. In an embodiment, a plurality of different electronic documents are stored in a data repository. A server computer system identifies one or more service software components of an application program that have been installed as part of a particular application instance. The server computer identifies a subset of one or more particular documents from the plurality of documents stored in the data repository that correspond to the identified one or more services. Using the subset of one or more particular documents, the server generates a particular customized document which is then stored in association with the particular application instance.

18 Claims, 5 Drawing Sheets

(56) References Cited

U.S. PATENT DOCUMENTS

2013/0091491 A1     4/2013   Koutyrine
2014/0289289 A1     9/2014   Fujioka

OTHER PUBLICATIONS

Green, R. "What You Installed Is What You See: Help Navigation in Modular Software Products", 18th Annual Conference Documentation dated Sep. 2000, pp. 521-533.
Green R., "component-based Software Development: Implications for Documentation", 17th Annual Conference on Computer Documentation dated 1999, pp. 159-164.
Chamberland, L., "Componentization of HTML-Based Online Help", 17th Annual International Conference on Computer Documentation dated 1999, pp. 165-168.
Campbell, U.S. Appl. No. 15/456,420, filed Mar. 10, 2017, Pre Office Action Interview, dated Jun. 2, 2017.
Campbell, U.S. Appl. No. 15/456,420, filed Mar. 10, 2017, Office Action, dated Aug. 27, 2018.
Campbell, U.S. Appl. No. 15/456,420, filed Mar. 10, 2017, Notice of Allowance, dated Mar. 15, 2019.
Campbell, U.S. Appl. No. 15/456,420, filed Mar. 10, 2017, Interview Summary, dated Apr. 5, 2018.
Campbell, U.S. Appl. No. 15/456,420, filed Mar. 10, 2017, Interview Office Action, dated Sep. 1, 2017.
Campbell, U.S. Appl. No. 15/456,420, filed Mar. 10, 2017, Final Office Action, dated Jan. 31, 2018.
Campbell, U.S. Appl. No. 15/456,420, filed Mar. 10, 2017, Advisory Action, dated Apr. 23, 2018.

BUILDING DYNAMIC DOCUMENTATION BASED ON INSTALLED SERVICES

BENEFIT CLAIM

This application claims the benefit under 35 U.S.C. § 120 of application Ser. No. 15/456,420, filed Mar. 10, 2017, which claims the benefit under 35 U.S.C. § 119(e) of provisional application 62/433,153, filed Dec. 12, 2016, the entire contents of which is hereby incorporated by reference for all purposes as if fully set forth herein.

FIELD OF THE DISCLOSURE

The present disclosure relates to distributed or centralized computing systems. More specifically, the example embodiment(s) described below relate to dynamically building a set of documentation based on installed services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In standard practice end-user documentation is provided together with software suites. The end-user documentation may include writings, diagrams, tutorials, practical examples, and any other documents helpful for an end user to learn the functions and use of given software. Examples include Help panels or search facilities, built-in manuals and the like.

As software suites become more complex, the end-user documentation becomes more complex, yet large portions of the documentation may be irrelevant to a particular user. The documentation provided to an end-user may become unwieldy due to the number of services described. Or, portions may be unnecessary when an end-user only installs a subset of the services offered in a software suite because the end-user is still provided with comprehensive documentation covering services that have not been installed.

As version management becomes complex, the comprehensive documentation approach often ignores or lags behind differences between versions of installed services. If an end-user installs a recent version of a first service, but an older version of a second service, comprehensive documentation would either fail to cover the combination or would be forced to cover every possible combination of services and versions. On the other hand, if documents are identified for only individual services, then the documents would be unable to describe interactions with other provided services.

Thus, there is a need for a system that generates dynamic documentation based on services and/or service versions that have been installed and that a user has permission to access. Additionally, there is a need for a system that includes each piece of information that may be relevant to an end-user while excluding information that corresponds to services that a user has not installed.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
General Overview
Host Computing Device Overview
Server Overview
Generating Dynamic Documentation
Example Implementation
Updating Documentation
Implementation Example—Hardware Overview
Implementation Example—Basic Software System
Extensions and Alternatives
General Overview
Techniques for dynamically generating documentation for installed services are provided. A service can be a single instance of a software product or software application installed on one or more hosts in the distributed computing environment. For example, a service might be a database server instance, a web server instance, or any other instance of a software product or a software application installed on one or more hosts. Often, a service is a network "server" service in that it responds to network requests from other network "client" services. A service can be both a server service and a client service, or just a client service, or just a server service. Further, a service can be, but need not be, a network service. That is, a service may perform operations at one or more hosts without sending or responding to network requests.

A host can be a single computing device. For example, a host can be a single server-computing device. Alternatively, a host can be a single virtual computer instance that executes on a computing device facilitated by a virtualization layer (e.g., a Type 1 or Type 2 hypervisor) interposed between the virtual computer instance and the computing device. Regardless if a single computing device or a single virtual computer instance, a host can be configured with an operating system (e.g., UNIX, LINUX, or WINDOWS) that manages the low-level aspects of host operation including managing execution of processes, memory allocation, file input and output (I/O), and device I/O. A host may also be configured with a container platform (e.g., DOCKER) for running services within containers on the operating system.

The distributed environment can be one or more data center facilities or other computer hosting facilities connected to the Internet or other public or private network. Services that execute as processes on hosts in the distributed computing environment may be configured using the distributed configuration platform described herein or in application Ser. No. 14/284,959, filed Oct. 4, 2016, the entire contents of which is hereby incorporated by reference as if fully set forth herein.

In one embodiment, a set of documentation for a plurality of services and/or versions of services is stored in a modular format in which different documents, elements or components can be selected and combined on a custom basis as appropriate for a particular application instance, installation or deployment. Using a service discovery mechanism, a programmed system identifies which specific services of the plurality of services have been installed on a host, in a networked environment, on the client computing device or are accessible to a particular user account. The system then identifies only those documents, elements, and components that are associated with the identified services and/or versions, and compiles just those materials into a single set of documentation which can be provided to the client or made accessible to the user account. Additionally, the system may identify portions of a document related to a first service to include or exclude based on which other services have also been installed; that is, software dependencies for services can be leveraged to create the documentation in a parallel manner.

In an embodiment, a method comprises storing, in a master data repository, a plurality of different electronic documents; identifying, using a server computer system, one or more service software components of an application program that have been installed as part of a particular application instance; identifying a subset of one or more particular documents from among the plurality of documents that is stored in the data repository, wherein the one or more particular documents correspond to only the one or more service software components that were identified as part of the particular application instance; generating a particular dynamic document using the subset of the one or more particular documents; storing the particular dynamic document in association with the particular application instance; wherein the method is performed using one or more processors.

In an embodiment, a system comprises a documentation repository storing a plurality of electronic documents, each of which containing one or more tokens identifying a corresponding service; service registration instructions for registering a service with a particular application instance; documentation build instructions for identifying and grouping relevant documents based on installed services; documentation compilation instructions for compiling identified documents into a set of documentation; and documentation deployment instructions for deploying a set of documentation to one or more host computing devices.

Host Computing Device Overview

Figure 1:
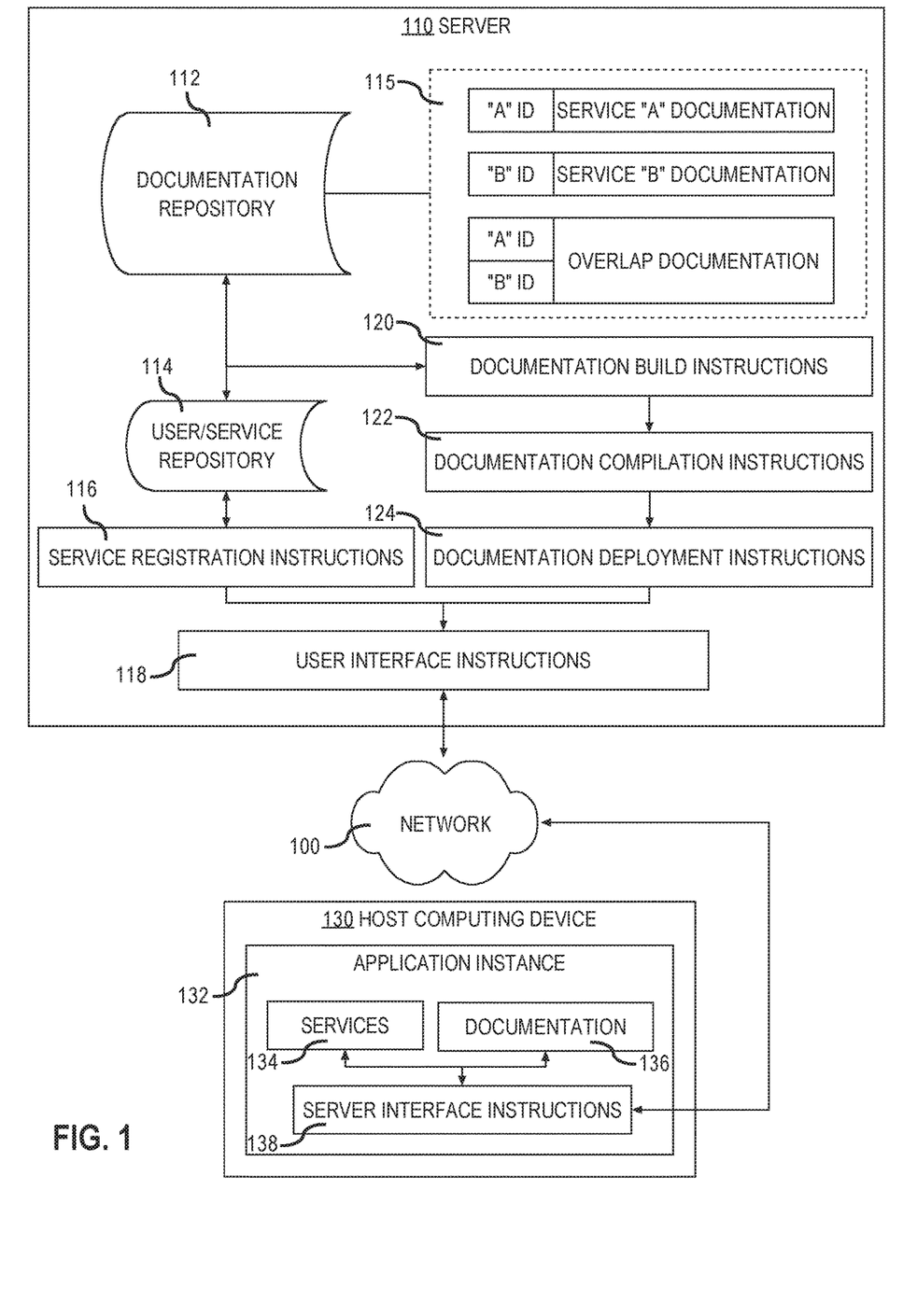
FIG. 1 depicts a schematic diagram of a distributed computing system for generating a set of dynamic documentation based on in installed services.

FIG. 1 depicts a schematic diagram of a distributed computing system for generating a set of dynamic documentation based on in installed services.

In an embodiment, the distributed computing system comprises a server computer ("server") 110 coupled via network 100 to a host computing device 130. The distributed computing system may be further configured for providing a plurality of services 134 installed on a cluster of a plurality of host computing devices (collectively, "hosts 130," or generally or singularly, "host 130") in the distributed computing environment, according to some example embodiments of the present disclosure. The distributed computing environment can be within one or more data center, virtual computing facility or other hosting facilities connected to a network such as, for example, the Internet or other network; other embodiments can be within a networked home, office, or campus. The number of hosts 130 in the cluster at a given time may vary in different embodiments and any number may be used.

A host 130 can be a single computing device such as, for example, the computing device 400 described below with respect to FIG. 4. Alternatively, a host 130 can be a single virtual computer instance that executes on a computing device facilitated by a virtualization layer interposed between the virtual computer instance and the computing device. The virtualization layer can be a virtual machine monitor such as, for example, virtual machine monitor 530 described below with respect to FIG. 5. Regardless if a single computing device or a single virtual computer instance, a host 130 can be configured with an operating system such as, for example, operating system 510 described below with respect to FIG. 5. The operating system of a host 130 can manage low-level aspects of the host's operation including managing execution of processes, memory allocation, file input and output (I/O), and device I/O. A host 130 may also be configured with a container system for running services 134 within containers on the host's operating system. An example of a container system is the DOCKER environment commercially available from Docker, Inc., San Francisco, Calif.

According to an embodiment, host 130 comprises application instance 132 which allows one or more services 134 to be deployed on host 130 from one or more server computing devices, such as server 110. For example, application instance 132 may contain server interface instructions which is programmed or configured to interact with user interface instructions 118 of server 110 over network 100 to receive executable files associated with one or more services.

A service 134 can be a single instance of a software product or software application installed on at least one of the hosts 130. For example, a service 134 might be a database server instance, a web server instance, or any other instance of a software product or a software application installed on one or more of the hosts 130. Multiple different services 134 may be installed on the hosts 130 including multiple different services 134 on the same host 130. For example, a service 134 may be installed on multiple of the hosts 130 in a distributed, clustered, load balanced, or failover computing arrangement.

Documentation 136 comprises documentation that correlates to services 134. Documentation 136 may comprise any of collected writings, diagrams, tutorials, and/or practical example that allow end-users to learn the functions and proper uses of services 134. Host computing device 130 may be programmed or configured to obtain documentation 136 from server 110 through server interface instructions 138. Methods for identifying documentation to be included in documentation 136 are described further herein.

The network 100 can connect the hosts 130 together within the distributed computing environment. Network 100 can actually be composed of multiple sub-networks connected together. For example, the network 100 can be an Internet Protocol Version 4-based and/or an Internet Protocol Version 6-based wired or wireless network or a combination of multiple such networks.

Server Overview

Server 110 is programmed or configured to store documentation components or documents for a plurality of services and generate individually tailored sets of documentation based on the specific services 134 that are installed on hosts 130 of a particular instance, installation or deployment. In one embodiment, the server 110 comprises a documentation repository 112 having contents 115, user/service repository 114 coupled to the documentation repository, and sets of programmed instructions hosted in memory or non-volatile storage comprising service registration instructions 116, user interface instructions 118, documentation build instructions 120, documentation compilation instructions 122, and documentation deployment instructions 124.

Documentation repository 112, in an embodiment, comprises a data repository storing a plurality of electronic documents corresponding to different services and/or service versions. The electronic documents may be stored in modular format, such that electronic documents for different services are separate from each other. Each electronic document may additionally include one or more tokens or other forms of data identifying one or more services that correspond to the electronic document. For example, in FIG. 1, in the contents 115 of the repository 112, documentation for service A is tagged with an identifier of service A and the documentation for service B is tagged with an identifier of service B.

In an embodiment, the data identifying the one or more services that correspond to the electronic document additionally identifies one or more versions of the one or more services that correspond to the electronic document. For example, a provider of service A may update service A as more features are developed. For each update, the provider releases a new version of service A. Additionally, some updates may require updates to the documentation, such as when a new feature adds additional functionality to the service or changes the user interface for a service. When server 110 receives updated documentation for a new version of a particular service, server 110 may tag an older version of the documentation as relevant up until the new version of the particular service.

As an example, assume that four versions service A exist: version 1.0, version 1.1, version 2.0, and version 2.1. Additionally, assume a first set of documentation was generated for service 1.0 and a second set of documentation was generated for version 2.0. Server 110 may store, with the first set of documentation, data identifying the first set of documentation as relevant for service A up until version 2.0. Server 110 may store, with the second set of documentation, data identifying the second set of documentation as relevant for service A from version 2.0 forward.

Additionally and/or alternatively, documentation for a particular service may be broken up in modular format to include different sections that may be included depending on a version of the service and/or installed configuration. Different components of a set of documentation for a particular service are referred to herein as subsections of the documentation. In an embodiment, subsections of a set of documentation corresponding to a particular service identify one or more versions of the service for which the documentation is relevant. For example, assume the documentation for service A includes four subsections. The first subsection of service A is tagged as relevant for every available version of service A. The second subsection of service A is tagged as relevant for versions 1.1 and 2.0. The third subsection is tagged as relevant from version 2.0 forward. The fourth subsection is tagged as relevant from version 2.1 forward.

By storing components in a modular format, the system allows for easier updates to the overall documentation without requiring a new full set of documentation to be added. For example, the second subsection and fourth subsection discussed above may refer to the same service which received an update in version 2.1. Instead of including the second subsection in three different sets of documentation, under the modular format only one copy of the second subsection needs to be stored in documentation repository 112.

In an embodiment, a subsection of the documentation may include a shell of the documentation. For example, the first subsection described in the example above is relevant for each version of the service. The first subsection may include one or more spaces for insertion of the second, third, and fourth subsections. The rest of the first subsection may include documentation that is relevant regardless of which version is being implemented.

In an embodiment, documentation repository 112 additionally includes overlap documentation. Overlap documentation corresponds to at least two different services. For example, one or more electronic documents may describe interactions between service A and service B. The overlap documentation may be stored on server 110 with data identifying both service A and service B as a prerequisite for the overlap documentation. Additionally and/or the data may identify possible alternatives for one of the services. For example, a particular set of overlap documentation may include data identifying service A and either service B or service C as a prerequisite for the overlap documentation.

In an embodiment, one or more subsections of a particular set of documentation may identify additional services that are prerequisites for the one or more subsections. For example, documentation for service A may include a first subsection that corresponds to service B and a second subsection that corresponds to service C. When server 110 determines that documentation for service A is needed, server 110 may additionally determine whether service B and service C are installed. If only service B has been installed, the first subsection would be included in the documentation while the second subsection is not included.

In an embodiment, subsections for a particular set of documentation correspond to both additional services and versions of either the particular set of documentation or the additional services. For example, a first subsection of documentation for service A may be stored with data identifying version 2.0 of service B. A second subsection of documentation for service A may be stored with data identifying version 2.0 of service A and any version of service C. Storing subsections with data identifying different services and required versions allows server 110 to provide documentation for crossover services only when the crossover services are actually relevant. For example, version 1.0 of service B may not be compatible with service A. Thus, documentation describing an overlap of service B with service A would be superfluous if only version 1.0 of service B was installed.

User/service repository 114, in an embodiment, comprises data identifying services that have been installed by different computing devices. The data may include unique identifiers for individual computing devices, individual accounts, workgroups, and/or other groupings of computing devices. For example, a particular set of services may be uniformly deployed across a workgroup comprising a plurality of computing devices. User/service repository 114 may store a unique identifier that identifies the workgroup. Additionally, user/service repository 114 identifies, for each unique identifier, which services have been installed on the computing devices associated with the unique identifier. The data may additionally identify which version of each service has been installed on the computing devices associated with the unique identifier. For example, a unique identifier for a first plurality of computing devices may be stored with data indicating that version 1.0 of service A, version 1.3 of service B, and version 2.0 of service D have been installed on the first plurality of computing devices associated with the unique identifier.

In an embodiment, each of service registration instructions 116, user interface instructions 118, documentation build instructions 120, documentation compilation instructions, and documentation deployment instructions 124 comprises a set of one or more pages of main memory, such as RAM, in the server 110 into which executable instructions have been loaded and which when executed cause the server to perform the functions or operations that are described herein with reference to those modules. For example, the service registration instructions 116 may comprise a set of pages in RAM that contain instructions which when executed cause performing the service registration functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of service registration instructions 116, user interface instructions 118, documentation build instructions 120, documentation compilation instructions, and documentation deployment instructions 124 also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. In other words, the drawing figure may represent the manner in which programmers or software developers organize and arrange source code for later compilation into an executable, or interpretation into bytecode or the equivalent, for execution by the server 110.

Service registration instructions 116 comprise computer readable instructions which, when executed by one or more processors of server 110, cause server 110 to register services with a particular set of computing devices. Registration may include confirming that particular services have been installed on the particular set of computing devices. Registration may additionally include storing, in the user/service repository 114, data identifying the registered software. Service registration instructions 116 may register particular services in response to deploying the services to a particular set of computing devices. For example, server 110 may execute a software deployment product which is used to deploy and manage products through a single system. When server 110 deploys a product or service to one or more computing devices, service registration instructions 116 may identify the one or more computing devices and the deployed service to service registration instructions 116.

Additionally and/or alternatively, service registration instructions 116 may use different methods for reporting installed products to user/service repository 114. For example, service registration instructions may generate a request to host computing device 130 to identify services for which host computing device 130 requires documentation. A user of host computing device 130 may manually identify each service and version of the service that is executing on the host computing device through a user interface. Service registration instructions 116 may cause registration of the identified services and storage of data indicating that the host computing device 130 has installed the indicated services.

User interface instructions 118, when executed by server 110, cause server 110 to communicated with host computing device 130 over network 100. Using user interface instructions 118, server 110 may interact with host computing device 130 in order to deploy software products, identify services installed on host computing device 130, and/or deploy documentation onto host computing device 130. User interface instructions 118 may additionally include instructions for causing displaying of a graphical user interface on host computing device 130 for installation of services, requests for documentation, and/or identification of additional services installed on host computing device 130 outside of the deployment product.

Documentation build instructions 120, when executed by server 110, cause server 110 to identify and retrieve appropriate pieces of documentation in documentation repository 112 based on data in user/service repository 114 identifying services installed on a host computing device. Additionally, documentation build instructions 120 may cause server 110 to order the identified documents and structure the identified documents into a format expected by documentation compilation instructions 122. Documentation build instructions 120 may further comprise instructions for adding additional elements to identified electronic documents, such as introduction and support sections, and a table of contents. In an embodiment, documentation build instructions further include instructions for dynamically generating an instruction document based on the identified electronic documents.

Documentation compilation instructions 122, when executed by server 110, cause server 110 to compile the retrieved electronic documents into a single set of documentation. Documentation compilation instructions 122 may additionally cause server 110 to format the single set of documentation based on one or more stored rules.

Documentation deployment instructions 124, when executed by server 110, cause server 110 to deploy a set of documentation on a host computing device. For example, server 110 may execute documentation deployment instructions 124 in order to identify a storage location on host computing device 130 for storing the documentation. Server 110 may further upload the documentation to host computing device 130 through an application programming interface of application instance 132. In embodiments, documentation deployment instructions 124 further cause server 110 to remove older versions of documentation from host computing device 130 when the new documentation is uploaded.

Generating Dynamic Documentation

Figure 3:
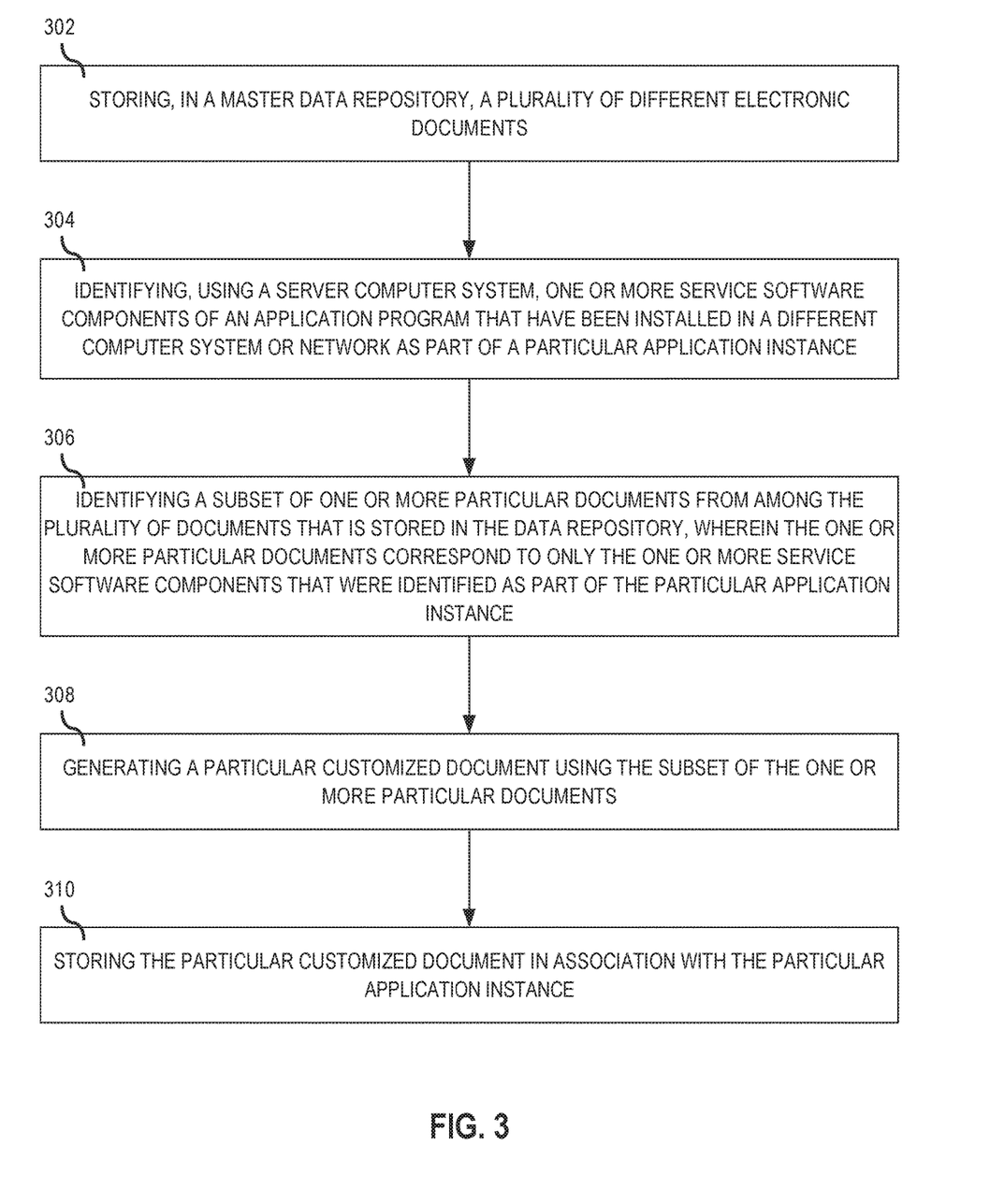
FIG. 3 depicts a method for generating dynamic documentation based on a subset of services.

FIG. 3 depicts a method for generating dynamic documentation based on a subset of services. FIG. 3, in combination with the description in this disclosure as a whole, may serve as an example algorithm, specification or plan for developing computer programs that implement the functions that are described. Further, FIG. 3 is described at the same level of detail that has been customary, for persons of the level of skill to whom this disclosure is directed, to communicate with others about the functions of other programs within the same general technical field.

At step 302, a plurality of different electronic documents is stored in a data repository. The plurality of different electronic documents may be stored in modular format with additional data identifying a service and/or a version of a service that corresponds to each electronic document.

In an embodiment, each electronic document is associated with only one service, version of a service, set of services, and/or set of versions of services. For example, a first electronic document may contain additional data identifying versions 1.0-3.0 of service A and versions 2.0-3.5 of service B. Any documentation that is only relevant prior to version 2.0 of service B would not be included in the first electronic document. Thus, in an embodiment, once an electronic document has been selected, the server may set aside the electronic document without performing any additional analysis regarding what to include in the selected document.

Additionally and/or alternatively, electronic documents may contain subsections along with additional information identifying a service, version of a service, set of services, and/or set of versions of services that are relevant for the document. For example, an electronic document for service A may include alternative subsections including a first subsection for versions 1.0-2.0 and a second subsection for versions 2.1-3.0. As another example, the electronic document for service A may include one subsection for interactions with service B and a second subsection for interactions with service C.

At step 304, one or more service software components of an application program that have been installed as part of a particular application instance are identified by a server computer system. For example, server 110 may store, in user/service repository, data identifying each service and/or each version of services that are installed or deployed on one or more host computing devices through a particular application instance. Server 110 may dynamically generate documentation for each application instance by identifying the application instance and corresponding services in the user/service repository. Additionally and/or alternatively, server 110 may request data regarding installed applications from an API of a software deployment product executing on host computing device 130.

At step 306, a subset of one or more particular documents are identified from among the plurality of documents stored in the data repository, wherein the one or more particular documents correspond to only the one or more service software components that were identified as part of the particular application instance. For example, server 110 may check each electronic document for data identifying services or versions of the document. If the services and/or versions of the services identified by the document have been installed, server 110 selects the electronic documents. Thus, if data corresponding to an electronic document identifies service A as a prerequisite and service A was not identified in step 304, then server 110 would not select the electronic document.

In an embodiment, identifying the subset of the one or more particular documents additionally comprises determining which subsections of each document to include based on one or more of additional installed services, version number, or both. For example, server 110 may select a document to include in response to determining that a service identified in data corresponding to the document has been installed on a host computing device. Server 110 may then look at additional data within the document that identifies prerequisite services and/or versions of services for each subsection. Server 110 may compare the additional data with the data identifying services installed on the host computing device to determine which subsections to include in the documentation.

At step 308, a particular dynamic document using the subset of the one or more particular documents is generated. Server 110 may compile the selected electronic documents into a single set of documentation based on one or more formatting and compiling rules. For example, a first compiling rule may identify an order of documents, such that related documents are compiled together. Thus, if three selected documents include a document for version 1.2 of service A, a document for service B, and a document for versions 1.0-3.0 of version A, the version A documents may be grouped together. As another example, a second compiling rule may comprise a rule for adding page numbers to the included electronic documents.

In an embodiment, the formatting and compiling rules additionally include rules for building an introduction and table of contents that identify documents included in the set of documentation. Server 110 may be programmed or configured to identify each selected document. For each selected document, server 110 may add a label in the introduction identifying the selected document. The label for each document may be taken from the document itself or from a data repository identifying each document. Server 110 may additionally order and number the labels in the introduction and table of contents based on the order of the selected documents.

Additionally and/or alternatively, an introduction document may be initially stored with a plurality of subsections that are included depending on whether a corresponding document is selected and/or whether a corresponding service was identified as installed. For example, the introduction may include ordered elements based on the documents stored in the document repository. The ordered elements of the introduction may additionally include data identifying documents and/or prerequisite services for including the elements. If, for a particular element, a perquisites service has been installed and/or a corresponding document has been selected, server 110 may include the element in the introduction. Alternatively, if the prerequisite service has not been installed and/or the corresponding document has not been selected, server 110 may not include the element in the introduction or table of contents. Server 110 may then number the remaining elements based on which elements have been included.

At step 310, the particular dynamic document is stored in association with the particular application instance. In an embodiment, server 110 stores the particular dynamic document on server 110 along with data identifying the particular application instance. When a request for documentation is received from a particular host computing device and/or user account associated with the particular application instance, server 110 may identify the corresponding documentation and provide it to the host computing device.

Additionally and/or alternatively, server 110 may deploy the documentation onto one or more host computing devices. For example, server 110 may generate the documentation in response to a host computing device requesting installation of a new service and/or a new version of a service. Server 110 may then send the documentation to the host computing device along with an executable software suite for the new service and/or new version of the service.

Server 110 may additionally remove any older versions of the documentation from the host computing device.

Example Implementation

Figure 2:
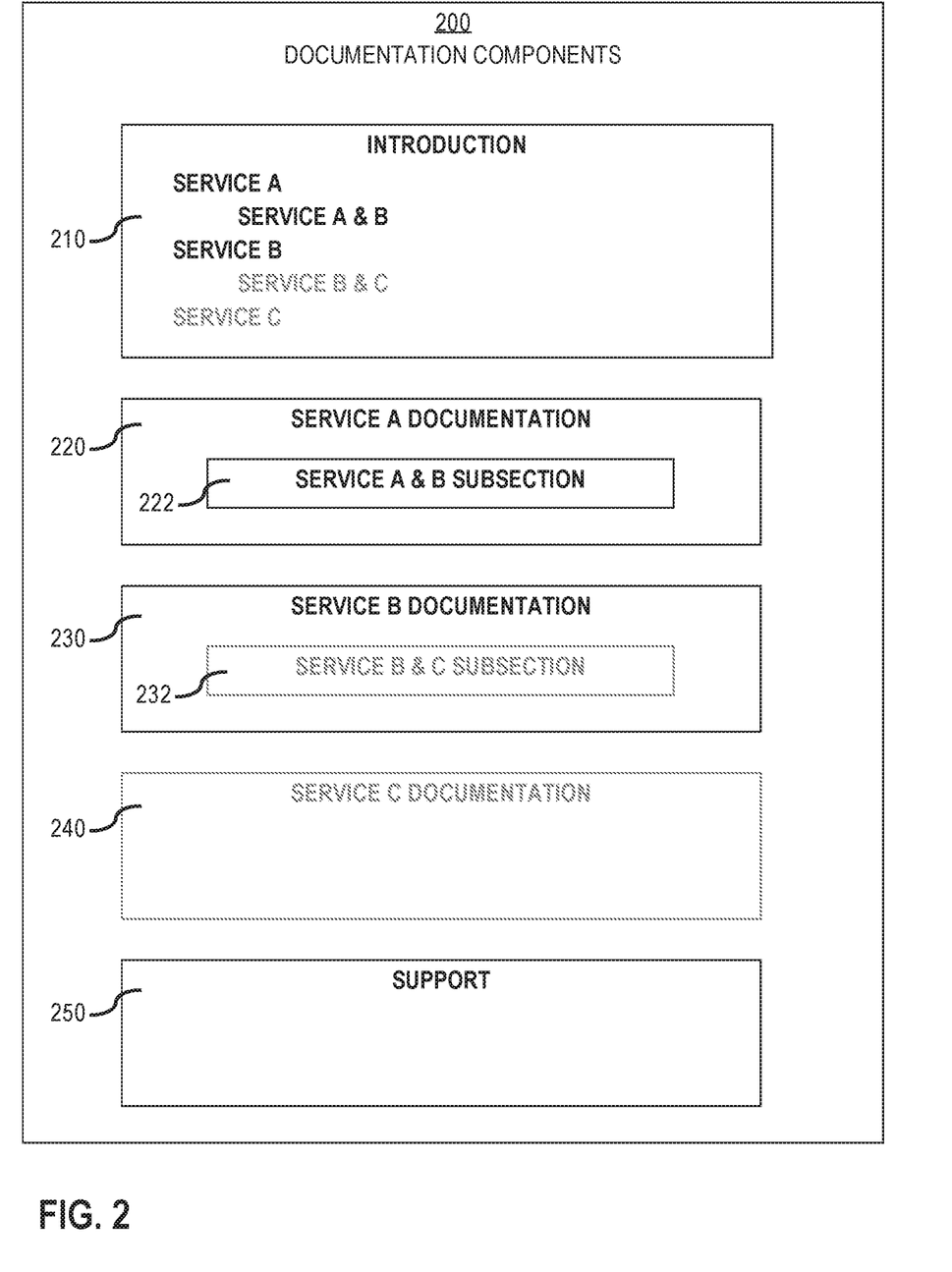
FIG. 2 depicts example dynamic documentation that is based on installed services.

FIG. 2 depicts example dynamic documentation that is based on installed services. FIG. 2 depicts one example comprising subsections of particular documents. Other embodiments may include modular sections for each version, set of versions, service, set of services, or any combination thereof. In FIG. 2, grayed out components indicate places where a document, subsection, or element would be placed if a corresponding service had been installed as part of an application instance. The solid black components indicate places where a document, subsection, or element have been place due to a corresponding service or corresponding services having been installed as part of the application instance.

Documentation components 200 comprise a set of documentation that is built for an application instance that contains services A and B but does not include service C. Documentation components 200 is one example of documentation based off of the existence of three disparate services. Other examples may include any number of service documents, each of which containing any number of subcomponents. Additionally and/or alternatively, separate documents may be used for different versions of services or interactions between a plurality of different services.

Service A documentation 220 includes documentation describing the uses of service A. As service A is installed as part of the particular application instance in FIG. 2, service A documentation is included as one of documentation components 200. Service A documentation 220 additionally includes service A & B subsection 222. As both service A and service B are installed as part of the application instance in FIG. 2, service A & B subsection 222 is included in documentation components 200.

Service B documentation 230 includes documentation describing the uses of service B. As service B is installed as part of the particular application instance in FIG. 2, service B documentation is included as one of documentation components 200. Service B documentation 230 additionally includes service B & C subsection 232. While service B is installed as part of the application instance in FIG. 2, service C has not been installed. Thus, service B & C subsection 232 is not included in documentation components 200.

Service C documentation 240 includes documentation describing the uses of service C. As service C is not installed as part of the particular application instance in FIG. 2, service C documentation is not included as one of documentation components 200. Thus, in an embodiment, the sections that would be visible to a user would be service A documentation 220 with service A & B subsection 222 and service B documentation 230 without service B & C subsection 232.

Introduction 210 includes identifiers of the sections that are included in documentation components 200. As service A documentation 220 and service A & B subsection 222 are included in documentation components 200, introduction 210 contains identifiers for service A and services A & B. As service B documentation 230 is included in documentation components 200 without service B & C subsection, introduction 210 contains an identifier for service B, but no identifier for services B & C. As service C documentation 240 is not included, introduction 210 does not contain an identifier for service C.

In an embodiment, documentation components 200 comprise a table of contents comprising identifiers of sections and/or subsections of the documentation along with an indication of a location of the sections and/or subsections. For example, if the documentation describing service B is located on the seventh page, the table of contents may include a line of text specifying "Service B . . . 7". In an embodiment, one or more lines of text in the table of contents include a hyperlink to the identified section and/or subsection. For example, the line of text specifying "Service B . . . 7" may include a hyperlink to page seven and/or the portion of page seven where the documentation of Service B begins.

In an embodiment, identifiers are based on the title of the actual subsection. Thus, if service A & B subsection is titled "Building a graph in Service A using data mined in service B," then the title of the subsection would be included in the introduction. Additional titles may also be included in the introduction. For example, service A documentation 220 may contain additional subsections that are always included in service A documentation 220 regardless of version or other services. In building the introduction, server 110 may include identification of each of the additional subsections of service A documentation in response to determining that service A documentation is to be included as one of documentation components 200. Server 110 may insert subsections dealing with different versions or different services in predetermined locations around the additional subsections.

Support 250 comprises additional support for the application instance. Support 250 may include one or more global components, such as support for a deployment product, which are always included in the documentation. Support 250 may also include service specific elements. For example, a Frequently Asked Questions (FAQ) section may be populated with questions and answers based on installed services. Server 110 may populate the FAQ in the same way that server 110 populates introduction 210.

Updating Documentation

In an embodiment, documentation is updated in response to server 110 detecting a change in an existing service deployed as a part of an application instance. The change in the service may include an update of an existing service, a swapping of versions of an existing service, and or removing an existing service. In an embodiment, server 110 generates a new version of the documentation based on the changed service and replaces the old version of the documentation with the new version of the documentation.

In an embodiment, server 110 only changes portions of the documentation that are affected by the change in the existing service. For example, server 110 may store data identifying, for each document in a set of documentation associated with a particular application instance, one or more services on which the document is dependent. When a service changes, server 110 may identify each document that was dependent on the changed service and determine whether the document needs to be removed and/or altered. For example, one section of the documentation may be included as long as at least one of services A or B are installed as part of the application instance. If service A is removed, server 110 may determine if service B is installed and, in response to determining that service B is still installed, determine that the section does not need to be removed.

Altering a document may include removing subsections, adding subsections, and or replacing existing subsections with different subsections. Thus, if a service was upgraded from version 2.0 to version 2.2, server 110 may replace a subsection that is only relevant until version 2.1 with a subsection that is relevant after version 2.1. As another example, if service A is removed from a particular application instance, then server 110 may remove all documents that are dependent on service A from the documentation.

In an embodiment, server 110 additionally updates documentation in response to determining that services have been added to an application instance. For example, host computing device 130 may request deployment of a previously uninstalled service. Upon performing the deployment, server 110 may identify each document in document repository 112 that is dependent on the added service. If server 110 identifies any documents, server 110 may update the documentation to include the additional documents. Updating the documentation may include adding the documents to an existing set of documentation. Additionally and/or alternatively, server 110 may build a new set of documentation each time a change in existing documentation is to be made.

Additionally and/or alternatively, server 110 may update documentation in response to an indication from a host computing device that a new service has been installed outside of the particular application instance. For example, one or more services may interact with products that are not offered by server 110, such as open source software that is available for a user to install outside of the particular application instance. Server 110 may provide a user interface on host computing device 130 for identifying any additional services that have been installed on the host computing device. Based on services identified by the host computing device, server 110 may update the documentation to include any sections or subsections that are dependent on the identified service.

In an embodiment, updating the documentation comprises changing one or more documents and/or subsets of documents in the set of documentation. For example, a particular document may initially include two subsections. Updating the particular document may include adding a section to the particular document that describes interactions with a newly added service. As another example, a document may include a subsection comprising a particular image that is stored in documentation repository 112 with data identifying a particular version of a service associated with the subsection. In response to determining that a new version of the service has been installed, server 110 may replace the subsection comprising the particular image in the document with a different subsection comprising a different image that is stored in documentation repository 112 with data identifying the new version of the service.

If any of the identified documents require an additional service and/or particular versions of the service, server 110 may additionally determine whether the additional service has been installed and/or whether the particular versions of the service have been installed. Upon determining that each prerequisite has been met for a particular document, server 110 may add the particular document to the existing documentation. In an embodiment, adding the document comprises inserting the document into a particular location of the documentation. The particular location may be designated by one or more rules which determine an order of the documentation. Additionally and/or alternatively, adding the document may comprise building a new set of documentation with the prior existing document as well as any added documents.

In an embodiment, updating the documentation comprises updating an introduction and/or one or more support documents. Server 110 may track changes made to the existing documentation, including which documents have been removed, added, or replaced. For each removed document, server 110 may remove the entry from the introduction and table of contents. For each added document, server 110 may add an entry to the introduction and table of contents. For each replaced document, server 110 may replace an entry in the introduction and table of contents. In a similar manner, server 110 may update any support documents by adding additional entries or sections for added documents, removing entries or sections for removed documents, and/or replacing entries or sections for replaced documents.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
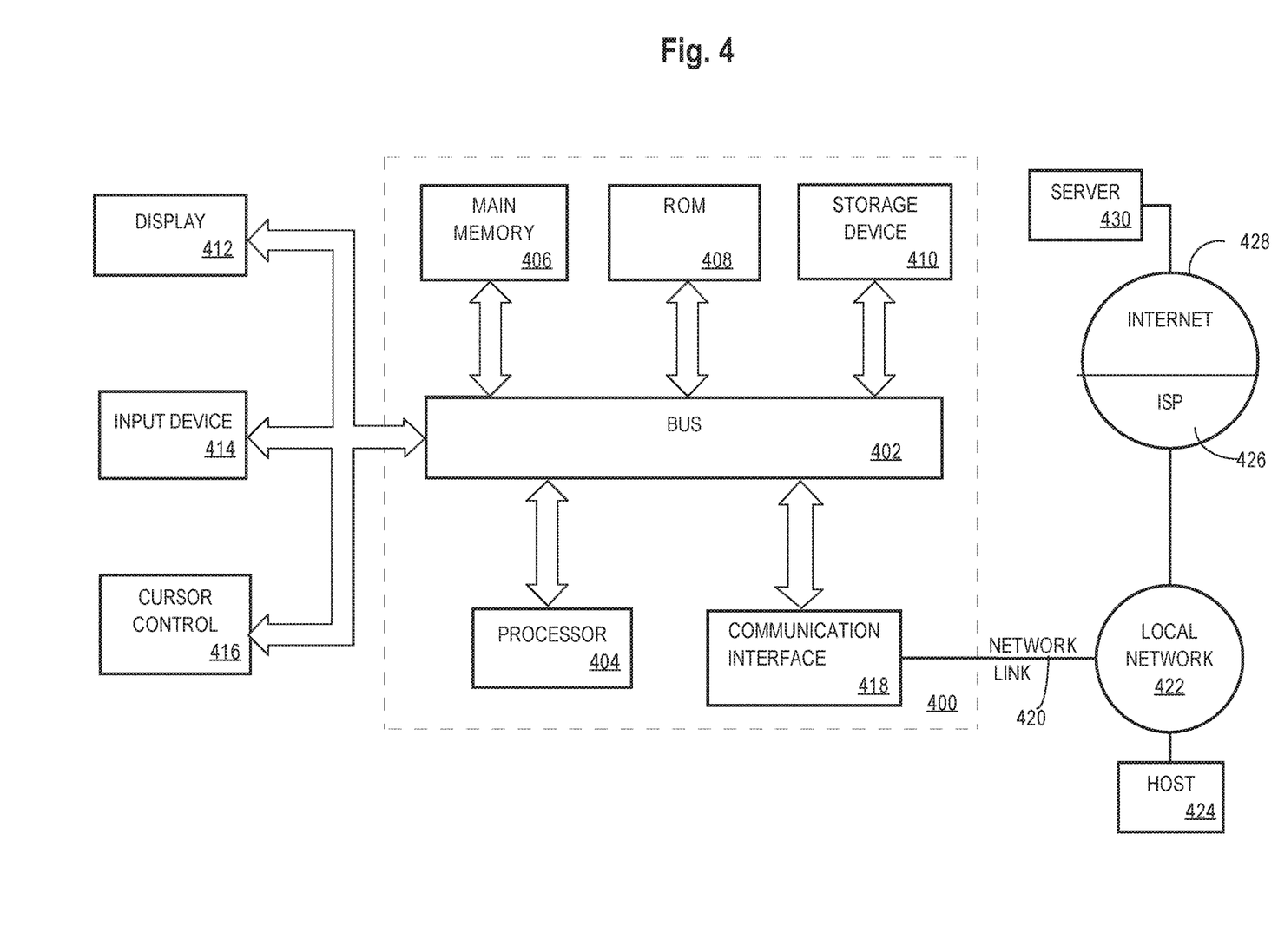
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
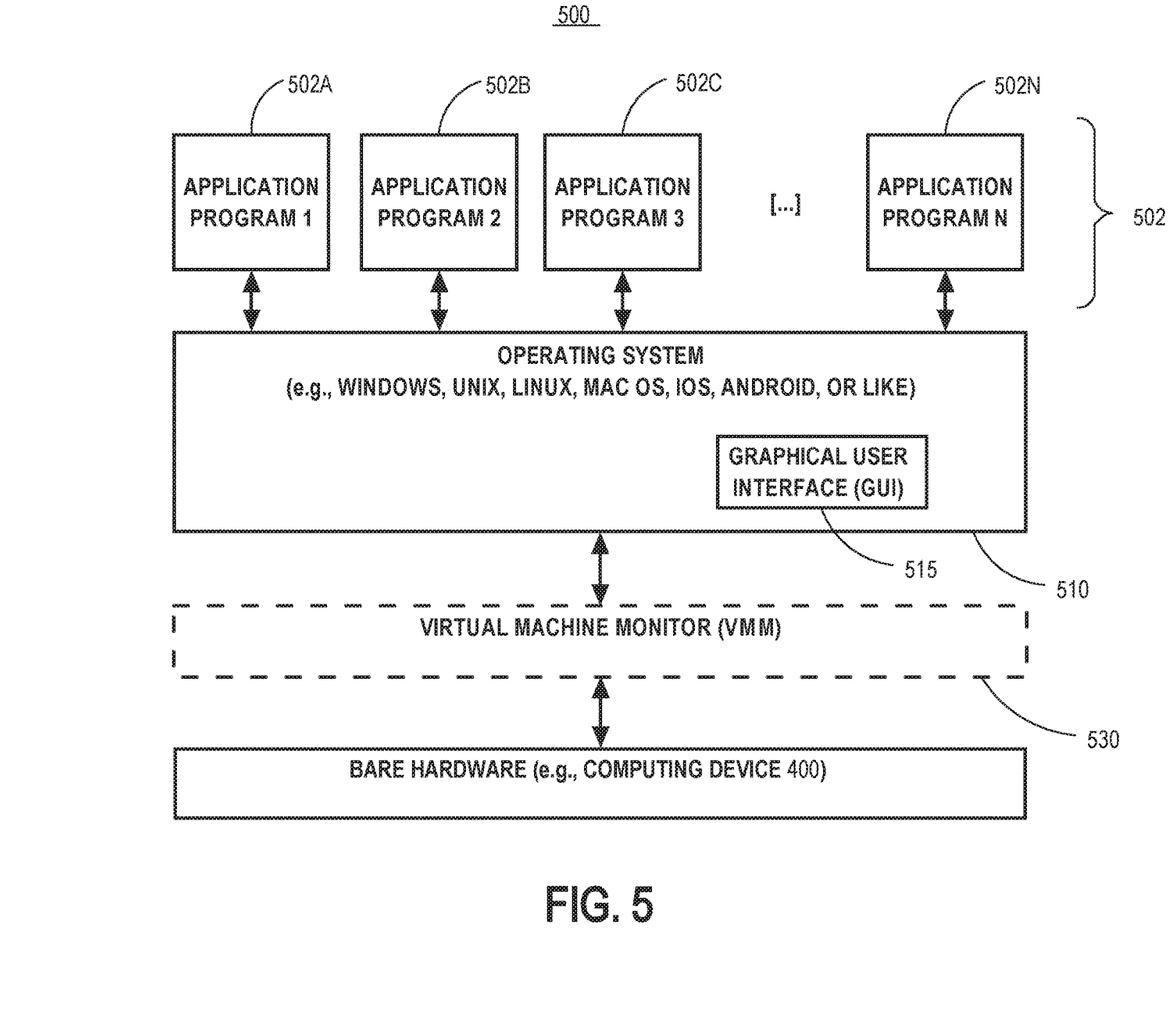
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   storing, in a master data repository, a plurality of different electronic documents;
   identifying, using a server computer system, one or more first service software components of an application program that have been installed as part of an application instance on a host computing device;
   identifying a subset of one or more first documents from among the plurality of documents that is stored in the data repository, wherein the server computer system is programmed or configured to include the one or more first documents in dynamic documents only in response to identifying the one or more first service software components have been installed as part of the application instance;
   identifying one or more second service software components of an application program that have been installed as part of the application instance on the host computing device;
   identifying a subset of one or more second documents from among the plurality of documents that is stored in the data repository, wherein the server computer system is programmed or configured to include the one or more second documents in dynamic documents only in response to identifying the one or more second service software components have been installed as part of the application instance;
   identifying, for a particular electronic document of the one or more first documents, a subsection of the particular electronic document that corresponds to the one or more first service software components and the one or more second service software components;
   generating a dynamic document using the one or more first documents and the one or more second documents;
   in response to identifying the one or more second service software components, including the subsection in a portion of the dynamic document corresponding to the particular electronic document;
   deploying the dynamic document to the host computing device;
   wherein the method is performed using one or more processors.

2. The method of claim 1, further comprising:
   identifying, for a first electronic document of the one or more documents corresponding to a first service software component, a subsection of the first electronic document that corresponds to the first service software component and a version of the second service software component;
   determining that the version of the second service software component has been installed as part of the particular application instance and, in response to determining, including the subsection in a portion of the dynamic document corresponding to the first electronic document.

3. The method of claim 1, further comprising:
   wherein the plurality of different electronic documents comprises a first electronic document corresponding to a first version of the one or more first service software components and a second electronic document corresponding to a second version of the one or more first service software components;
   wherein the identified one or more service software components comprise the first version of the first service software component and not the second version of the first service software component;
   including, in the subset of the one or more documents, the first electronic document and not the second electronic document based, at least in part, on the identified one or more service software components comprising the first version of the first service software component and not the second version of the first service software component.

4. The method of claim 1, further comprising:
   identifying, for a first electronic document of the one or more documents corresponding to a first service software component, a subsection of the first document that corresponds to at least a first version of the first service software component;
   determining that the one or more first service software components includes the first version of the first service software component and, in response to determining, including the subsection in a portion of the dynamic document corresponding to the first electronic document.

5. The method of claim 1, further comprising:
determining an additional service software component of an application program has been installed as part of the particular application instance;
identifying a subset of one or more additional documents from among the plurality of documents that is stored in the master data repository, wherein the one or more additional documents correspond to the additional service software component;
updating the dynamic document using the one or more additional documents.

6. The method of claim 5, further comprising:
identifying a second subsection of a first electronic document of the one or more first documents that is dependent on a first service software component of the identified one or more first service software components and the additional service software component;
wherein the second subsection of the first electronic document was not included in the dynamic document;
including, in a portion of the updated dynamic document corresponding to the first service software component, the second subsection of the first electronic document.

7. The method of claim 1, further comprising:
storing, in the master data repository, dependency data identifying for each dynamic document, each service software component on which each portion of the dynamic document is dependent;
determining that a service software component corresponding to the dynamic document has been changed;
using the dependency data, identifying one or more portions of the dynamic document that are dependent on the service software component;
updating the dynamic document by updating the identified one or more portions based on the changed service software component.

8. The method of claim 7, wherein updating the identified one or more portions comprises changing one or more of the one or more first documents.

9. The method of claim 1, further comprising:
storing, in the master data repository, dependency data identifying for each dynamic document, each service software component on which each portion of the dynamic document is dependent;
determining that a service software component corresponding to the dynamic document has been removed;
using the dependency data, identifying one or more portions of the dynamic document that are dependent on the service software component;
updating the dynamic document by removing the identified one or more portions based on the removed service software component.

10. A system comprising:
one or more processors;
one or more storage media;
one or more instructions stored in the storage media which, when executed by the one or more processors, cause performance of:
storing, in a master data repository, a plurality of different electronic documents;
identifying one or more first service software components of an application program that have been installed as part of a particular application instance;
identifying a subset of one or more particular documents from among the plurality of documents that is stored in the data repository, wherein a server computer system is programmed or configured to include the one or more particular documents in dynamic documents only in response to identifying the one or more first service software components have been installed as part of the particular application instance;
identifying one or more second service software components of an application program that have been installed as part of the application instance;
identifying a subset of one or more second documents from among the plurality of documents that is stored in the data repository, wherein the server computer system is programmed or configured to include the one or more second documents in dynamic documents only in response to identifying the one or more second service software components have been installed as part of the application instance;
identifying, for a particular electronic document of the one or more particular documents, a subsection of the particular electronic document that corresponds to the one or more first service software components and the one or more second service software components;
generating a particular customized document using the one or more particular documents and the one or more second documents;
in response to identifying the one or more second service software components, including the subsection in a portion of the particular customized dynamic document corresponding to the particular electronic document;
deploying the dynamic document to the host computing device.

11. The system of claim 10, wherein the instructions, when executed by the one or more processors, further cause performance of:
identifying, for a first electronic document of the one or more particular documents corresponding to a first service software component, a subsection of the first electric document that corresponds to the first service software component and a particular version of the second service software component;
determining that the particular version of the second service software component has been installed as part of the particular application instance and, in response to determining, including the subsection in a portion of the particular customized document corresponding to the first electronic document.

12. The system of claim 11, wherein the instructions, when executed by the one or more processors, further cause performance of:
storing, in the master data repository, dependency data identifying for each customized document, each service software component on which each portion of the customized document is dependent;
determining that a particular service software component corresponding to the particular customized document has been changed;
using the dependency data, identifying one or more portions of the particular customized document that are dependent on the particular service software component;
updating the particular customized document by updating the identified one or more portions based on the changed particular service software component.

13. The system of claim 12, wherein updating the one or more portions comprises changing one or more of the one or more first documents.

14. The system of claim 11, wherein the instructions, when executed by the one or more processors, further cause performance of:

storing, in the master data repository, dependency data identifying for each customized document, each service software component on which each portion of the customized document is dependent;

determining that a particular service software component corresponding to the particular customized document has been removed;

using the dependency data, identifying one or more portions of the particular customized document that are dependent on the particular service software component;

updating the particular customized document by removing the identified one or more portions based on the removed particular service software component.

15. The system of claim 10, wherein the instructions, when executed by the one or more processors, further cause performance of:

wherein the plurality of different electronic documents comprises a first electronic document corresponding to a first version of the one or more first service software components and a second electronic document corresponding to a second version of the one or more first service software components;

wherein the identified one or more service software components comprise the first version of the first service software component and not the second version of the first service software component;

including, in the subset of the one or more particular documents, the first electronic document and not the second electronic document based, at least in part, on the identified one or more service software components comprising the first version of the first service software component and not the second version of the first service software component.

16. The system of claim 10, wherein the instructions, when executed by the one or more processors, further cause performance of:

identifying, for a first electronic document of the one or more particular documents corresponding to a first service software component, a subsection of the first document that corresponds to at least a first version of the first service software component;

determining that the one or more first service software components includes the first version of the first service software component and, in response to determining, including the subsection in a portion of the particular customized document corresponding to the first electronic document.

17. The system of claim 10, wherein the instructions, when executed by the one or more processors, further cause performance of:

determining an additional service software component of an application program has been installed as part of the particular application instance;

identifying a subset of one or more additional documents from among the plurality of documents that is stored in the master data repository, wherein the one or more additional documents correspond to the additional service software component;

updating the particular customized document using the one or more additional documents.

18. The system of claim 17, wherein the instructions, when executed by the one or more processors, further cause performance of:

identifying a second subsection of a first electronic document of the one or more particular documents that is dependent on a first service software component of the identified one or more first service software components and the additional service software component;

wherein the second subsection of the first electronic document was not included in the particular customized document;

including, in a portion of the updated particular customized document corresponding to the first service software component, the second subsection of the first electronic document.

* * * * *